US010023129B2

(12) United States Patent
Ehlers

(10) Patent No.: US 10,023,129 B2
(45) Date of Patent: Jul. 17, 2018

(54) VEHICLE MOUNTED CRANE ASSEMBLY

(71) Applicant: Chad Ehlers, Fairmont, MN (US)

(72) Inventor: Chad Ehlers, Fairmont, MN (US)

( * ) Notice: Subject to any disclaimer, the term of this patent is extended or adjusted under 35 U.S.C. 154(b) by 24 days.

(21) Appl. No.: 15/232,464

(22) Filed: Aug. 9, 2016

(65) Prior Publication Data
US 2018/0043835 A1 Feb. 15, 2018

(51) Int. Cl.
*B60P 9/00* (2006.01)
*B60R 9/06* (2006.01)

(52) U.S. Cl.
CPC ..................... *B60R 9/06* (2013.01)

(58) Field of Classification Search
CPC ............... B60R 9/06; B66C 23/36; B66C 23/44; B66C 23/18; B66C 13/54; B66C 23/06; B66C 23/00; B66C 23/26; B66C 23/203; B66C 23/68
USPC ...... 414/462–466, 10–12; 212/175, 179–181
See application file for complete search history.

(56) References Cited

U.S. PATENT DOCUMENTS

| | | | |
|---|---|---|---|
| 2,397,271 A * | 3/1946 | Ladwig | B66C 23/005 212/202 |
| 4,069,922 A | 1/1978 | Hawkins | |
| 5,211,526 A | 5/1993 | Robinette | |
| 5,431,526 A * | 7/1995 | Peterson | B60P 1/5433 212/223 |
| 5,971,177 A | 10/1999 | Carter | |
| D429,051 S | 8/2000 | Porter | |
| 6,244,813 B1 * | 6/2001 | Cataldo | B60P 3/125 224/521 |
| 6,312,210 B1 * | 11/2001 | Lang | B60R 9/06 224/570 |
| 6,578,722 B2 | 6/2003 | Perkins et al. | |
| 6,981,834 B1 * | 1/2006 | Henry | B60P 1/5471 212/299 |
| 7,798,760 B2 | 9/2010 | Strassman et al. | |
| 2008/0100076 A1 * | 5/2008 | Potts | B60R 9/06 296/3 |

FOREIGN PATENT DOCUMENTS

WO WO9923025 5/1999

* cited by examiner

*Primary Examiner* — Anna M Momper
*Assistant Examiner* — Lynn E Schwenning

(57) ABSTRACT

A vehicle mounted crane system for mounting a crane on a vehicle includes a vehicle has a bed and a hitch. A mounting unit is removably coupled to the hitch. A crane unit is removably coupled to the mounting unit. The crane unit selectively lifts an object thereby facilitating the vehicle to transport the object.

16 Claims, 6 Drawing Sheets

VEHICLE MOUNTED CRANE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art including information disclosed under 37 CFR 1.97 and 1.98

The disclosure and prior art relates to crane devices and more particularly pertains to a new crane device for mounting a crane on a vehicle.

BRIEF SUMMARY OF THE INVENTION

An embodiment of the disclosure meets the needs presented above by generally comprising a vehicle has a bed and a hitch. A mounting unit is removably coupled to the hitch. A crane unit is removably coupled to the mounting unit. The crane unit selectively lifts an object thereby facilitating the vehicle to transport the object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
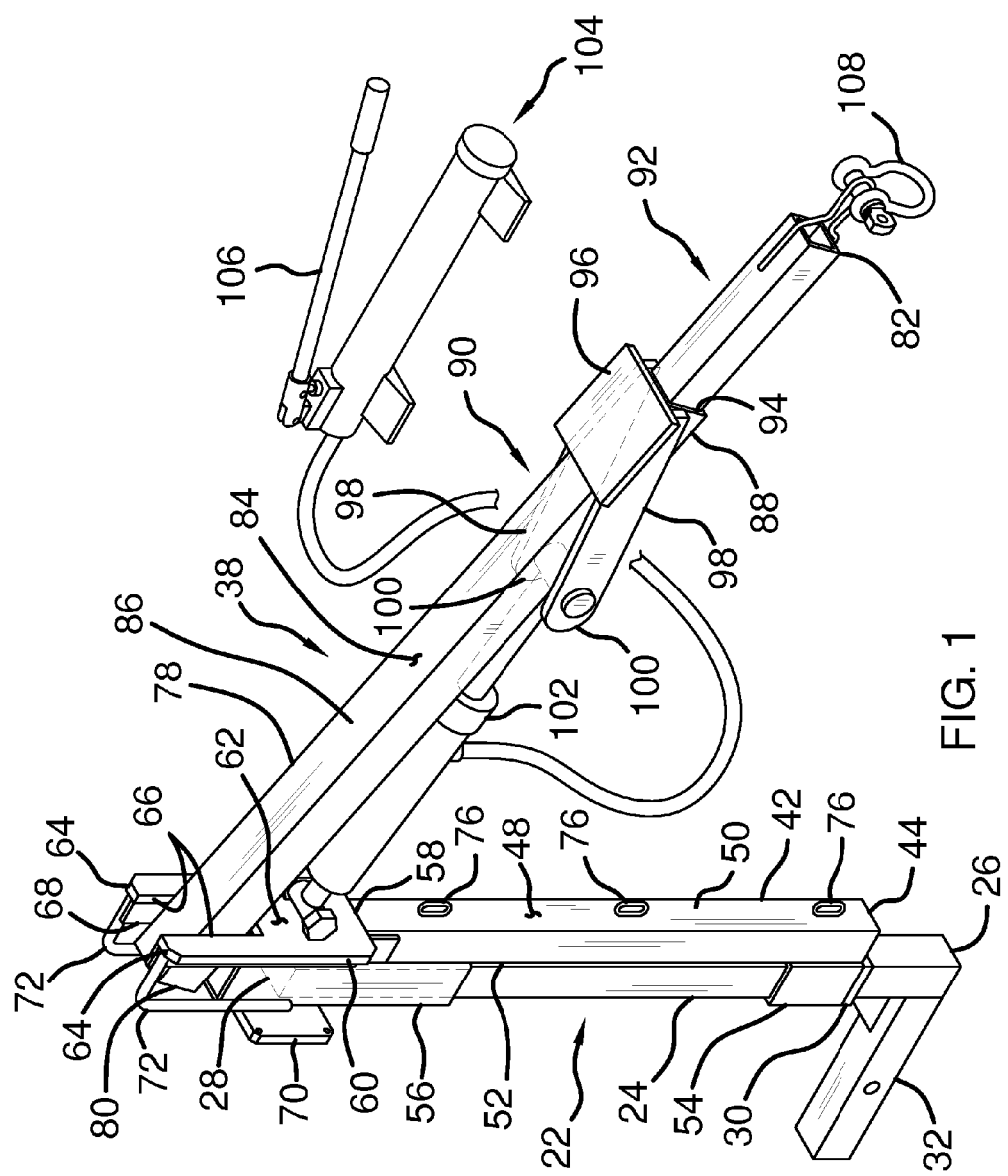
FIG. 1 is a perspective view of a vehicle mounted crane system according to an embodiment of the disclosure.
Figure 2:
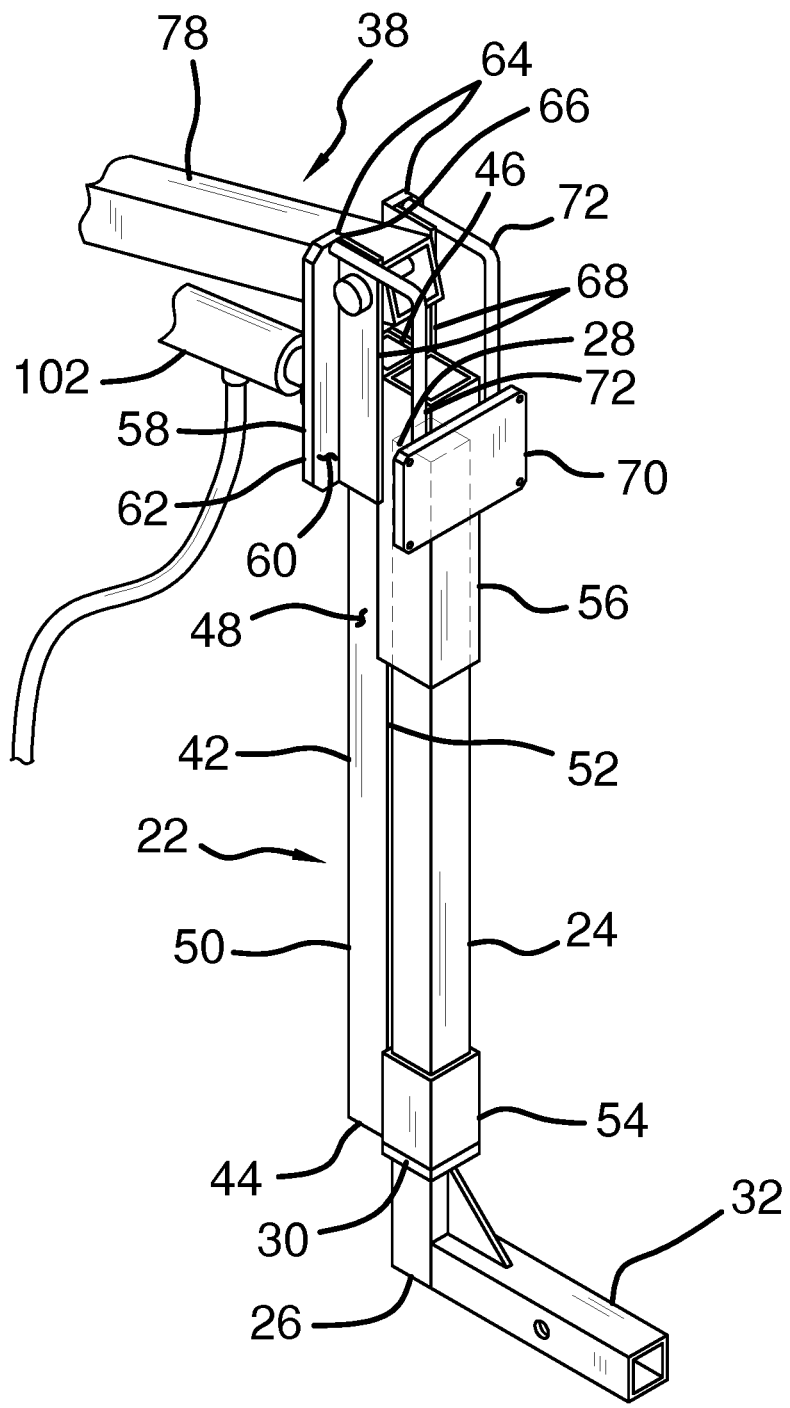
FIG. 2 is a back perspective view of an embodiment of the disclosure.
Figure 3:
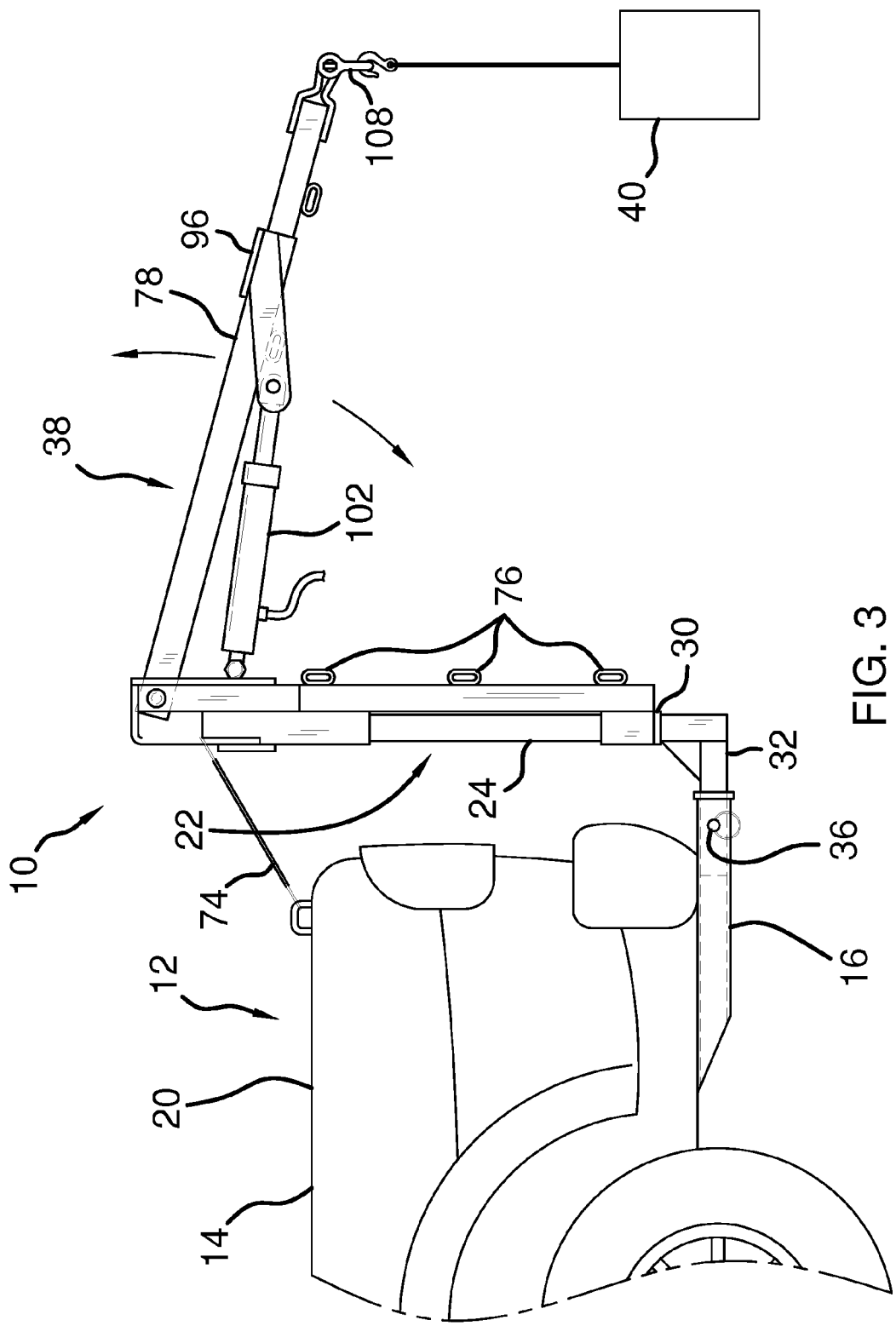
FIG. 3 is a left side view of an embodiment of the disclosure.
Figure 4:
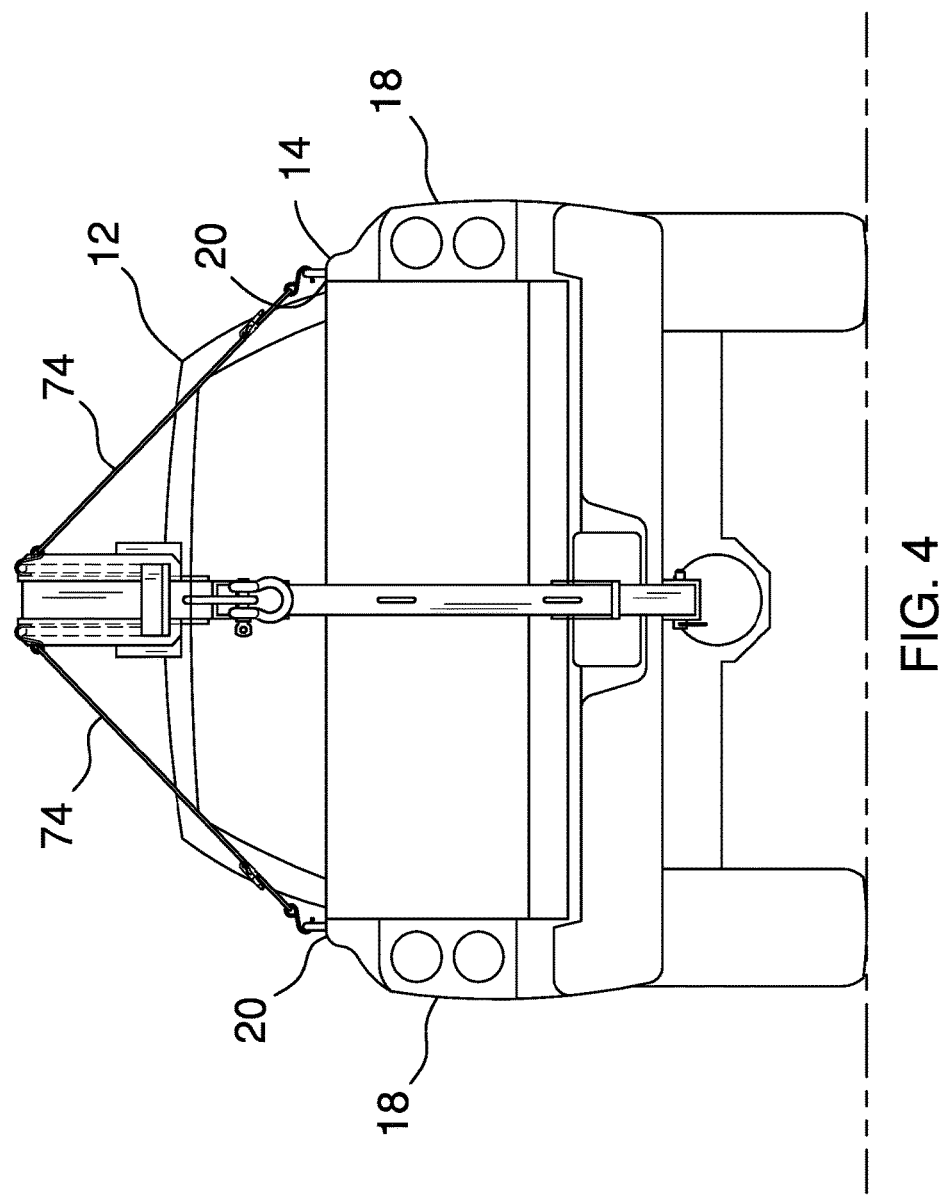
FIG. 4 is a back view of an embodiment of the disclosure.

With reference now to the drawings, and in particular to FIGS. 1 through 6 thereof, a new crane device embodying the principles and concepts of an embodiment of the disclosure and generally designated by the reference numeral 10 will be described.

As best illustrated in FIGS. 1 through 6, the vehicle mounted crane system 10 generally comprises a vehicle 12. The vehicle 12 has a bed 14 and a hitch 16. The bed 14 has a pair of lateral walls 18 and each of the lateral walls 18 has a top edge 20. The vehicle 12 may be a pickup or the like.

A mounting unit 22 is provided and the mounting unit 22 is removably coupled to the hitch 16. The mounting unit 22 comprises a first member 24 that has a first end 26 and a second end 28. The first member 24 has a lip 30 extending outwardly from the first member 24. The lip 30 extends around an entire perimeter of the first member 24. The lip 30 is positioned closer to the first end 26 than the second end 28.

A second member 32 is coupled the first member 24 and the second member 32 is aligned with the first end 26. The second member 32 is oriented perpendicular to the first member 24. The second member 32 is slidably inserted into the hitch 16. Thus, the first member 24 is vertically oriented.

A pin 36 is provided. The pin 36 may be manipulated. The pin 36 extends through the hitch 16 and engages the second member 32. Thus, the mounting unit 22 is removably coupled to the hitch 16.

A crane unit 38 is provided. The crane unit 38 is removably coupled to the mounting unit 22. The crane unit 38 may selectively lift an object 40 thereby facilitating the vehicle 12 to transport the object 40. The object 40 may be an object 40 that is too heavy for a person to lift. The crane unit 38 comprises a third member 42 that has a primary end 44, a secondary end 46 and an outer surface 48 extending therebetween. The outer surface 48 has a front side 50 and a back side 52.

A first sleeve 54 is coupled to the back side 52 and the first sleeve 54 is positioned closer to the primary end 44 than the secondary end 46. A second sleeve 56 is coupled to the back side 52. The second sleeve 56 is positioned closer to the secondary end 46 than the primary end 44. Each of the first sleeve 54 and the second sleeve 56 slidably receives the first member 24 of the mounting unit 22. Thus, the third member 42 is coextensive with the first member 24. The first sleeve 54 abuts the lip 30 on the first member 24.

A first panel 58 is provided that has a first surface 60 and a second surface 62. The first surface 60 is coupled to the front side 50 of the third member 42. The first panel 58 includes a pair of fingers 64. Each of the fingers 64 extends upwardly from the first panel 58. The fingers 64 are spaced apart from each other.

Each of the fingers 64 has an inwardly facing edge 66. The first panel 58 includes a pair of rearward facing walls 68. Each of the rearward facing walls 68 extends away from the first surface 60. Each of the rearward facing walls 68 is aligned with the inwardly facing edge 66 of an associated one of the fingers 64.

A second panel 70 is coupled to the second sleeve 56. The second panel 70 is aligned with the back side 52 of the third member 42. The second panel 70 is aligned with the first panel 58. A pair of rods 72 is provided and each of the rods 72 is coupled between the second panel 70 and the first panel 58. A pair of straps 74 is provided. Each of the straps 74 is coupled between an associated one of the rods 72 and the top edge 20 of an associated one of the lateral walls 18 of the bed 14. Each of the straps 74 retains the third member 42 is a vertical orientation.

A plurality of rings 76 is provided. Each of the rings 76 is coupled to the front side 50 of the third member 42. The rings 76 are spaced apart from each other. A fourth member 78 is provided that has a first end 80, a second end 82 and an outermost surface 84 extending therebetween. The outermost surface 84 has a top side 86 and a bottom side 88.

The fourth member 78 is positioned between the fingers 64 on the first panel 58.

The first end 80 of the fourth member 78 is hingedly coupled to each of the rearward facing walls 68 of the first panel 58. Moreover, the fourth member 78 extends away from the third member 42. The first end 80 of the fourth member 78 is spaced from the second end 28 of the first member 24. Thus, the first end 80 of the fourth member 78 is inhibited from engaging the second end 28 of the first member 24.

The fourth member 78 comprises a first half 90 that is slidably coupled to a second half 92. Thus, the fourth member 78 has a telescopically adjustable length. The first half 90 has a terminal end 94. A third panel 96 is coupled to the top side 86 of the fourth member 78 corresponding to the first half 90. The third panel 96 is aligned with the terminal end 94.

A pair of arms 98 is provided. Each of the arms 98 is coupled to and extends downwardly from the third panel 96. Each of the arms 98 is spaced from the fourth member 78. Each of the arms 98 has a distal end 100 with respect to the third panel 96.

A piston 102 is provided. The piston 102 is coupled between the second surface 62 of the first panel 58 and the distal end 100 of each of the arms 98. The piston 102 selectively lifts and lowers the fourth member 78. The piston 102 may comprise a hydraulic piston 102 or the like.

A pump 104 is provided and the pump 104 is fluidly coupled to the piston 102. The pump 104 includes a lever 106 and the lever 106 may be manipulated. The pump 104 may comprise a hydraulic fluid pump 104 or the like. The pump 104 urges the piston 102 to selectively lift the fourth member 78 when the lever 106 is manipulated. The pump 104 may have a release valve and the release valve may be manipulated to lower the fourth member 78.

A shackle 108 is provided. The shackle 108 is coupled to the second end 82 of the fourth member 78. An object 40 may be coupled to the shackle 108. Thus, the fourth member 78 may lift and lower the object 40.

Figure 5:
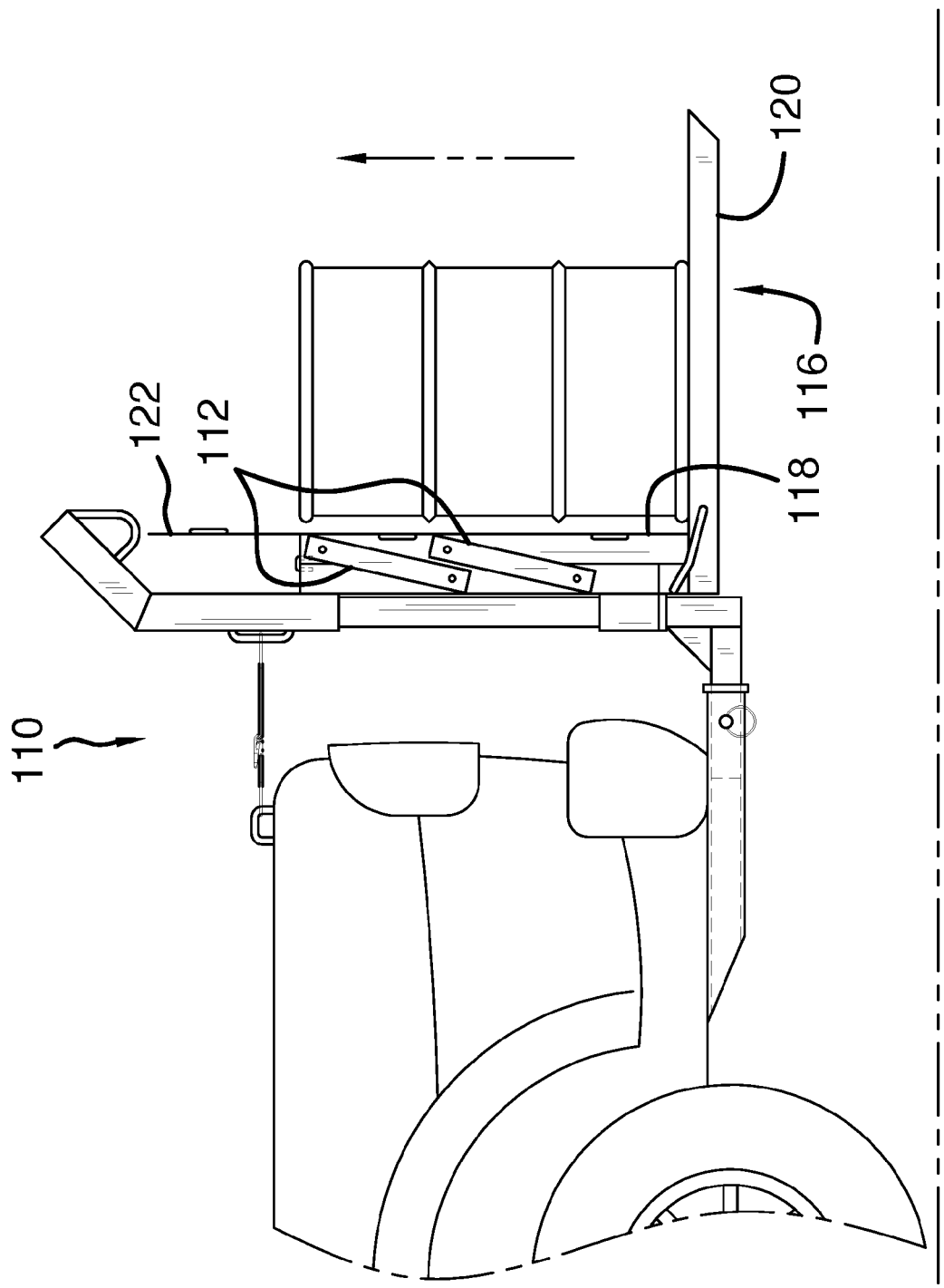
FIG. 5 is a left side view of an alternative embodiment of the disclosure.
Figure 6:
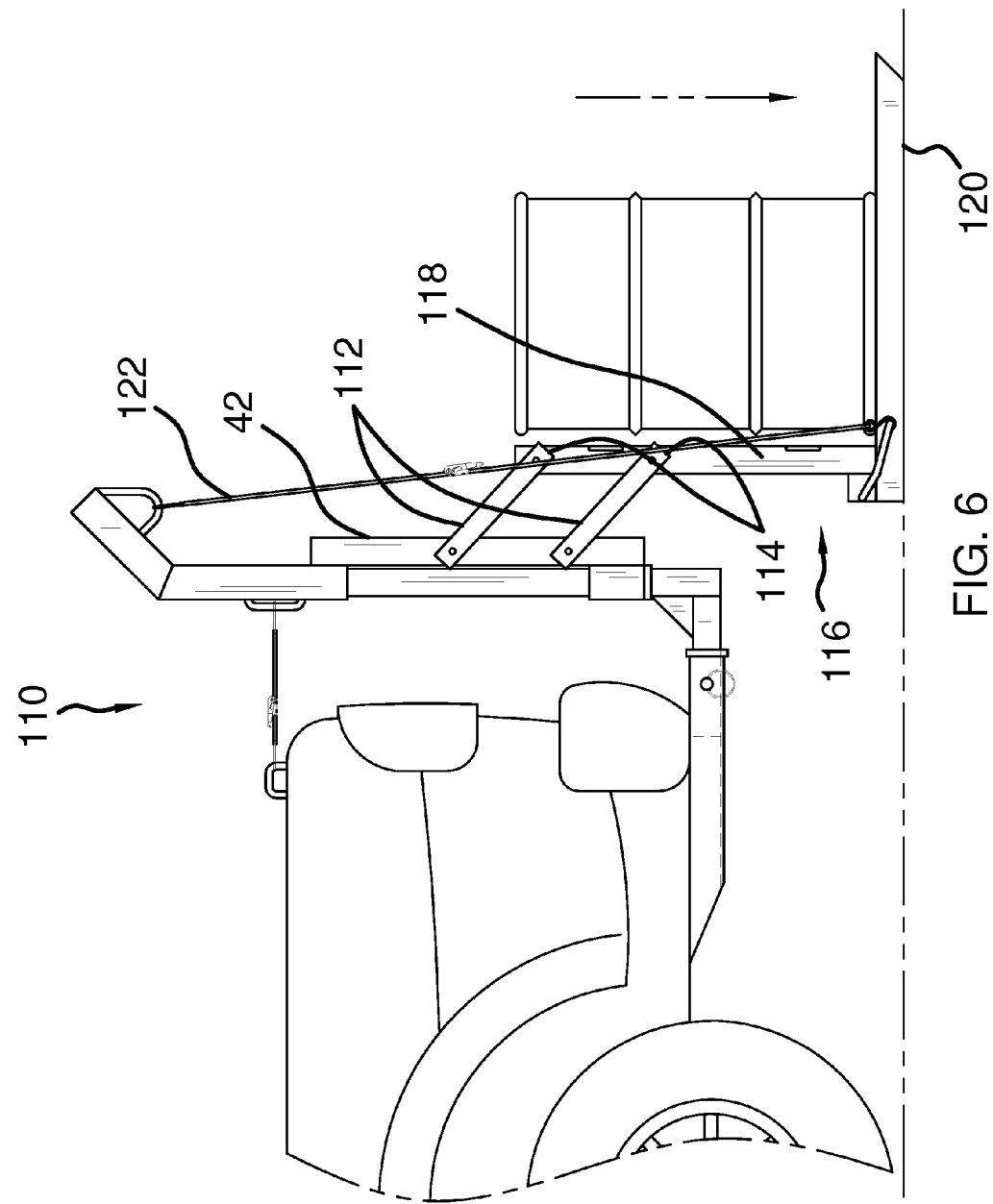
FIG. 6 is a left side perspective view of an alternative embodiment of the disclosure.

In an alternative embodiment 110 as shown in FIGS. 5 and 6, a plurality of arms 112 may be provided. Each of the arms 112 may be hingedly coupled to the third member 42. Each of the arms 112 may have a distal end 114 with respect to the third member 42. A fork lift 116 may be provided that has an upright 118 and a pair of forks 120. Each of the forks 120 may be coupled to and extend away from the upright 118. The distal end 114 of each of the arms may be hingedly coupled to the upright 118.

The object 40 may be positioned on each of the forks 120. A ratcheting unit 122 may be coupled between the second sleeve 56 and the fork lift 116. The ratcheting unit 122 may be manipulated to lift the fork lift 116. Thus, the object 40 is selectively lifted. The object 40 may be a barrel or other object 40 not easily coupled to the shackle 108. The ratcheting unit 122 may be a come-along or the like.

In use, the mounting unit 22 is coupled to the hitch 16 on the pickup. Each of the first sleeve 54 and the second sleeve 56 are slidably positioned on the first member 24. The straps 74 are coupled between the rods 72 and the bed 14 of the vehicle 12. Thus, each of the straps 74 inhibits the object 40 from urging the third member 42 away from the vehicle 12. The pump 104 is fluidly coupled to the piston 102.

The object 40 is coupled to the shackle 108 with a cable or the like. The lever 106 on the pump 104 is manipulated to lift the object 40. Thus, the vehicle 12 is facilitated to transport the object 40. The pump 104 is manipulated to lower the object 40. The object 40 is uncoupled from the shackle 108. The mounting unit 22 and the crane unit 38 facilitate the object 40 to be lifted and transported without the use of a skid steer or the like.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle mounted crane system comprising:
   a vehicle having a bed and a hitch;
   a mounting unit being removably coupled to said hitch, wherein said mounting unit comprises a first member having a first end and a second end, said mounting unit including a second member being coupled to said first member;
   a crane unit being removably coupled to said mounting unit wherein said crane unit is configured to selectively lift an object thereby facilitating said vehicle to transport the object, wherein said crane unit comprises a third member having a primary end, a secondary end and an outer surface extending therebetween, said outer surface having a front side and a back side;
   a first panel having a first surface and a second surface, said first surface being coupled to said front side of said third member; and wherein said first panel includes a pair of fingers, each of said fingers extending upwardly from said first panel, said fingers being spaced apart from each other, each of said fingers having an inwardly facing edge.

2. The system according to claim 1, wherein said mounting unit comprises said first member having a lip extending outwardly from said first member, said lip extending around an entire perimeter of said first member, said lip being positioned closer to said first end than said second end.

3. The system according to claim 2, further comprising said second member being aligned with said first end, said second member being oriented perpendicular to said first member, said second member being slidably inserted into said hitch having said first member being vertically oriented.

4. The system according to claim 3, further comprising a pin being configured to be manipulated, said pin extending through said hitch and engaging said second member such that said mounting unit is removably coupled to said hitch.

5. The system according to claim 1, wherein: said mounting unit comprises said first member having a lip; a first sleeve being coupled to said back side of said third member, said first sleeve being positioned closer to said primary end than said secondary end; and a second sleeve being coupled to said back side of said third member, said second sleeve being positioned closer to said secondary end than said primary end, each of said first sleeve and said second sleeve slidably receiving said first member of said mounting unit such that said third member is coextensive with said first member, said first sleeve abutting said lip on said first member.

6. The system according to claim 1, wherein said first panel includes a pair of rearward facing walls, each of said rearward facing walls extending away from said first surface, each of said rearward facing walls being aligned with said inwardly facing edge of an associated one of said fingers.

7. The system according to claim 6, further comprising a fourth member having a first end, a second end and an outermost surface extending therebetween, said outermost surface having a top side and a bottom side, said fourth member being positioned between said fingers on said first panel, said first end of said fourth member being hingedly coupled to each of said rearward facing walls of said first panel such that said fourth member extends away from said third member.

8. The system according to claim 7, wherein: said mounting unit includes said first member having said second end; and said first end of said fourth member being spaced from said second end of said first member such that said first end of said fourth member is inhibited from engaging said second end of said first member.

9. The system according to claim 7, wherein said fourth member comprises a first half being slidably coupled to a second half such that said fourth member has a telescopically adjustable length, said first half having a terminal end.

10. The system according to claim 9, further comprising: a third panel being coupled to said top side of said fourth member corresponding to said first half, said third panel being aligned with said terminal end; a pair of arms, each of said arms being coupled to and extending downwardly from said third panel, each of said arms being spaced from said fourth member, each of said arms having a distal end with respect to said third panel; a piston being coupled between said second surface of said first panel and said distal end of each of said arms such that said piston selectively lifts and lowers said fourth member; and a pump being fluidly coupled to said piston wherein said pump is configured to be manipulated, said pump urging said piston to selectively lift and lower said fourth member when said pump is manipulated.

11. The system according to claim 7, further comprising a shackle being coupled to said second end of said fourth member wherein said shackle is configured to be coupled to an object thereby facilitating said fourth member to lift and lower the object.

12. The system according to claim 1, further comprising a plurality of rings, each of said rings being coupled to said front side of said third member, said rings being spaced apart from each other.

13. A vehicle mounted crane system comprising:
a vehicle having a bed and a hitch;
a mounting unit being removably coupled to said hitch, wherein said mounting unit comprises a first member having a first end and a second end, said first member having a lip, said mounting unit including a second member being coupled to said first member;
a crane unit being removably coupled to said mounting unit wherein said crane unit is configured to selectively lift an object thereby facilitating said vehicle to transport the object, wherein said crane unit comprises a third member having a primary end, a secondary end and an outer surface extending therebetween, said outer surface having a front side and a back side;
a first sleeve being coupled to said back side, said first sleeve being positioned closer to said primary end than said secondary end; and
a second sleeve being coupled to said back side, said second sleeve being positioned closer to said secondary end than said primary end, each of said first sleeve and said second sleeve slidably receiving said first member of said mounting unit such that said third member is coextensive with said first member, said first sleeve abutting said lip on said first member;
a first panel; and
a second panel being coupled to said second sleeve, said second panel being aligned with said first panel.

14. The system according to claim 13, further comprising a pair of rods, each of said rods being coupled between said second panel and said first panel.

15. The system according to claim 14, further comprising:
said bed having a pair of lateral walls, each of said lateral walls having a top edge; and
a pair of straps, each of said straps being coupled between an associated one of said rods and said top edge of an associated one of said lateral walls of said bed, each of said straps retaining said third member in a vertical orientation.

16. A vehicle mounted crane system comprising:
a vehicle having a bed and a hitch, said bed having a pair of lateral walls, each of said lateral walls having a top edge;
a mounting unit being removably coupled to said hitch, said mounting unit comprising:
a first member having a first end and a second end, said first member having a lip extending outwardly from said first member, said lip extending around an entire perimeter of said first member, said lip being positioned closer to said first end than said second end,
a second member being coupled to said first member, said second member being aligned with said first end, said second member being oriented perpendicular to said first member, said second member being slidably inserted into said hitch having said first member being vertically oriented, and a pin being configured to be manipulated, said pin extending through said hitch and engaging said second member such that said mounting unit is removably coupled to said hitch; and a crane unit being removably coupled to said mounting unit wherein said crane unit is configured to selectively lift an object thereby facilitating said vehicle to transport the object, said crane unit comprising:

a third member having a primary end, a secondary end and an outer surface extending therebetween, said outer surface having a front side and a back side, a first sleeve being coupled to said back side, said first sleeve being positioned closer to said primary end than said secondary end, a second sleeve being coupled to said back side, said second sleeve being positioned closer to said secondary end than said primary end, each of said first sleeve and said second sleeve slidably receiving said first member of said mounting unit such that said third member is coextensive with said first member, said first sleeve abutting said lip on said first member, a first panel having a first surface and a second surface, said first surface being coupled to said front side of said third member, said first panel including a pair of fingers, each of said fingers extending upwardly from said first panel, said fingers being spaced apart from each other, each of said fingers having an inwardly facing edge, said first panel including a pair of rearward facing walls, each of said rearward facing walls extending away from said first surface, each of said rearward facing walls being aligned with said inwardly facing edge of an associated one of said fingers, a second panel being coupled to second sleeve, said second panel being aligned with said back side of said third member, said second panel being aligned with said first panel, a pair of rods, each of said rods being coupled between said second panel and said first panel, a pair of straps, each of said straps being coupled between an associated one of said rods and said top edge of an associated one of said lateral walls of said bed, each of said straps retaining said third member is a vertical orientation, a plurality of rings, each of said rings being coupled to said front side of said third member, said rings being spaced apart from each other, a fourth member having a first end, a second end and an outermost surface extending therebetween, said outermost surface having a top side and a bottom side, said fourth member being positioned between said fingers on said first panel, said first end of said fourth member being hingedly coupled to each of said rearward facing walls of said first panel such that said fourth member extends away from said third member, said first end of said fourth member being spaced from said second end of said first member such that said first end of said fourth member is inhibited from engaging said second end of said first member, said fourth member comprising a first half being slidably coupled to a second half such that said fourth member has a telescopically adjustable length, said first half having a terminal end, a third panel being coupled to said top side of said fourth member corresponding to said first half, said third panel being aligned with said terminal end, a pair of arms, each of said arms being coupled to and extending downwardly from said third panel, each of said arms being spaced from said fourth member, each of said arms having a distal end with respect to said third panel, a piston being coupled between said second surface of said first panel and said distal end of each of said arms such that said piston selectively lifts and lowers said fourth member, a pump being fluidly coupled to said piston wherein said pump is configured to be manipulated, said pump urging said piston to selectively lift and lower said fourth member when said pump is manipulated, and a shackle being coupled to said second end of said fourth member wherein said shackle is configured to be coupled to an object thereby facilitating said fourth member to lift and lower the object.

* * * * *